March 5, 1963
J. M. E. LAPRAY
3,079,939
BY-PASSING DEVICE WITH A TRAP FOR LAND
IRRIGATION AND OTHER APPLICATIONS
Filed Dec. 11, 1959
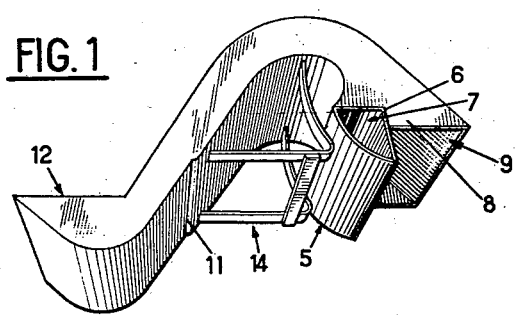
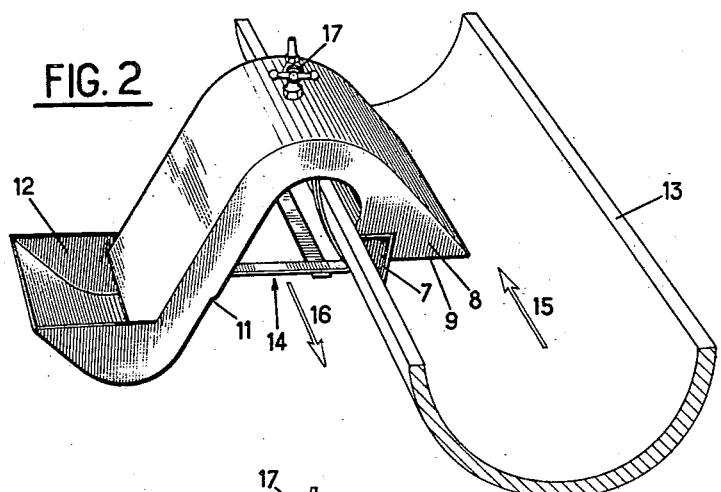
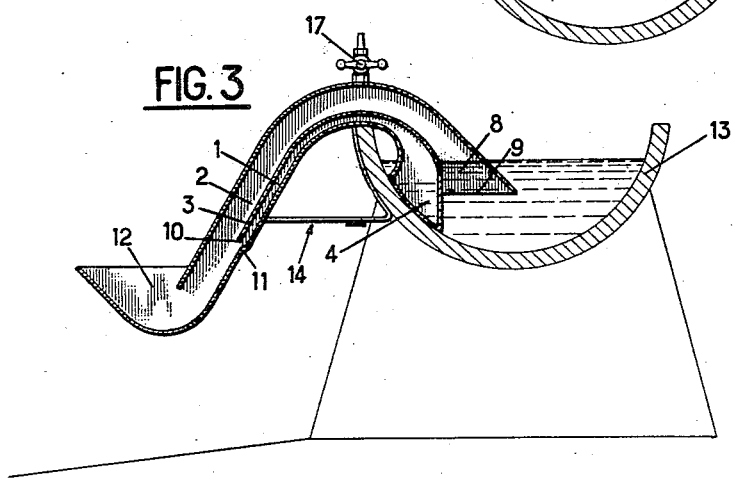
INVENTOR
J. M. E. Lapray
ATTORNEYS

United States Patent Office 3,079,939
Patented Mar. 5, 1963

3,079,939
BY-PASSING DEVICE WITH A TRAP FOR LAND IRRIGATION AND OTHER APPLICATIONS
Judith Marie Elvire Lapray, 5 Rue de Moscou, Rabat, Morocco
Filed Dec. 11, 1959, Ser. No. 858,926
Claims priority, application Morocco Dec. 13, 1958
3 Claims. (Cl. 137—128)

In water supply networks under pressure through irrigation ditches, in particular those networks intended to irrigate lands, partial or full by-passing of the flow in the various branches of the network is usually obtained by means of small locks or valves closing at will appropriately shaped orifices at determined spots at each irrigation ditch. Such a conventional arrangement has many drawbacks, particularly the necessity of anticipating beforehand, at the time the water supply network is constructed, all the locations of the by-passing orifices, since it will be then very difficult to modify after the event the number and/or the location of said orifices, in particular with modern irrigation ditches made from concrete. Moreover all the orifices should be provided with a lock, which leads to very high installation expenses, and these locks, especially those which are of the conventional vertical sliding type, become worn and deteriorate very rapidly and are never liquid-tight, which results in leakage amounting to a very high flow due to the number of said orifices.

As a matter of fact, the present invention has for its object to eliminate all the recited drawbacks.

Another object of this invention is to provide by-passes capable of being installed after the construction of an irrigation ditch without any dismantling work.

Still another object of the invention is to provide by-passes adapted to be instantaneously removed or displaced.

Another object is to provide by-passes of this kind adapted to insure a perfect water-tightness to the irrigation ditch when said by-passes are in an inoperative condition or position.

Another object is to provide by-passes of this kind adapted to insure a flow which is not greatly affected by the level in the irrigation ditch.

Still another object is to provide by-passes of this kind sufficiently rough to be wear-proof in spite of the unavoidable presence of sand and earth in the water.

Still another object of this invention is to provide a movable or removable device for by-passing a liquid flowing in an irrigation ditch, essentially characterized by the fact that it comprises in combination a trap provided with an automatic priming means for the same, means for unpriming said trap, mounting means, and possibly a member for restricting fully or partly the flow downstream said irrigation ditch.

In a particular embodiment of my invention which constitutes a moving by-pass, the trap is provided with two parallel ducts separated by a partition. The first of said ducts, which has a small cross-section and constitutes a first trap, communicates with an orifice disposed at right angles with the irrigation ditch so that said first trap may be primed under the simple effect of the kinetic energy of the liquid in the irrigation ditch, or if necessary by moving the whole apparatus. Said first trap is provided at the other end thereof with an ejection mouth for carrying out the air in the main trap constituted by the second of said ducts, so as to prime said main trap. Said main trap, which has a large cross-section, is in communication with a large orifice horizontally disposed in the irrigation ditch beneath the liquid surface and, moreover, it comprises at its highest point an air intake which may be put into communication with the atmosphere so that said trap may be unprimed.

In order that this invention may be better understood, there will be now described two illustrative and by no means limitative embodiments thereof as examples and shown in the annexed drawings, in which:

FIG. 1 illustrates in perspective the first embodiment according to this invention;

FIG. 2 shows in perspective the device of FIG. 1 in position on the irrigation ditch; and FIG. 3 is a section of said device.

Referring now to the drawings, and in particular to FIGS. 1, 2 and 3, there can be seen that the first embodiment of the by-pass with a trap is constituted by a sole element made from a welded sheet metal, comprising in its inside a first duct 1 having a rectangular cross-section and the configuration of a trap, separated from a second duct 2, having also a rectangular cross-section, by a partition 3. Said duct 1 communicates with a chamber 4 the end 5 of which is closed, and the end 6 of which is provided with an orifice 7, the section of which lies in a vertical plane normal to the direction of the flow of the liquid in the irrigation ditch, when the device is disposed thereon. Duct 2 communicates with the irrigation ditch through a flared-out section 8 and an orifice 9 having a rectangular cross-section which lies in a horizontal plane. At its other end, the partition 3 terminates in a horizontal edge 10, and the lower wall is provided with an ejecting mouth 11 constituted by a horizontal ridge which is parallel to said edge 10 where ducts 1 and 2 meet. The sole duct resulting therefrom communicates further with a jump 12 forming a weir.

The whole apparatus may be disposed on an irrigation ditch 13, as shown in FIGS. 2 and 3, and maintained in position by means of a bracket 14, the direction of the flow of the water in the irrigation ditch 13 being indicated by the arrow 15 (FIG. 2). The water, owing to its inherent speed of flow, rushes through orifice 7 into chamber 4 and causes the pressure in the latter to be increased, which results in priming the trap constituted by said duct 1. The flow from trap 1 passes through the ejecting element constituted by the narrow orifice between the edge 10 and the ridge 11, the effect of said ejecting element causing the air in duct 2 to be drawn up in the manner of a water-blast, or more simply causing a spouting out of this water into the supply provided inside the jump or weir 12, so as to progressively carry off the air contained in duct 2 in the form of bubbles escaping by the weir. This causes a rapid priming of the trap comprising the duct 2, which by-passes an important part of the irrigation ditch flow, owing to the large section of orifice 9.

In some cases, according to the present invention, if the flow speed of the water in the irrigation ditch is insufficient to cause the priming of trap 1 as soon as the device is installed, such priming may be nevertheless realized by increasing artificially the speed of the flow relative to the device, either by moving locally and momentarily the water by means of a plane instrument (a board, a shovel, an oar, and the like), or by moving sharply the whole device parallel to the irrigation ditch in the direction of arrow 16. In either case, priming of the main trap 2 is achieved further as described hereinabove.

It is to be well understood that the water so by-passed and issuing from the weir 12 may be then either used on the spot or used to supply another irrigation ditch transverse to the first one. When it is desired to stop the by-passing of the water, it is only necessary, if the device has a small size, to remove the same to stop any by-passed flow. Conversely, if said apparatus is too heavy to be removed full of water, it can be provided with a tap 17 by means of which the uppermost point of the main trap 2 may be put into communication with the atmosphere to unprime said main trap so that it will be only necessary to lift the weight of the water contained in trap 1. In the same manner it is also possible, if necessary, to unprime also the trap 1 by providing the same with a second tap.

It is an easy matter to see that the flow of the water by-passed by this by-passing device depends only upon the size of the various parts of the apparatus and the suction depression corresponding to the loss of head between the level in the irrigation ditch and the weir. Such flow varies then relatively little.

Of course, if it is desired to vary the flow of the by-pass, it is possible either to use apparatus having different sizes, or to introduce a restriction, for example in the section of the weir 12, by means of a device (not shown).

The water flowing through the weir 12 may either be used directly or flow in another irrigation ditch transverse to the first one, which allows in particular to irrigate large areas of lands with a network of ditches disposed in two directions and at different levels, since the by-passes from one ditch to another, and from each ditch to a place of use, will be obtained by means of a small number of apparatuses of this kind disposed at the desired locations and capable of being displaced at every moment according to the needs.

From all the preceding, it is evident that my siphon has not only the advantage resulting from the small number thereof which is necessary, but also is practically everlasting, even with the presence of sand and/or earth; in effect, it does not comprise any sliding element.

Finally, it is clear that when using one of my siphons and when all the useless by-passes have been eliminated (by unpriming and tilting and/or removing the device) the leakage flow in the whole supply network is positively zero, whatever may be the extent of said network.

It is to be understood that the embodiment described hereinabove and shown in the drawings is only illustrative and by no means limitative, and that those skilled in the art may bring thereto any desirable modification without being outside the scope of this invention as described in the appended claims. In particular the device according to my invention could be used with any liquid and any shape of irrigation ditches even with a flow speed which is null or substantially null.

What I claim is:
1. A portable dual siphon for use in lifting water over the wall of an irrigation ditch, said dual siphon comprising a curved pipe open at both ends and adapted to be mounted on the wall of a ditch, said pipe being defined by an arched lower wall bridging and defining a central channel, an arched upper wall also bridging said channel but spaced further therefrom, and side walls connecting said upper and lower walls to define said pipe, said side walls extending in a direction transverse to said channel, said pipe being divided by an intermediate longitudinal wall into upper and lower siphons, said upper siphon being larger in cross-section than said lower siphon, one of said side walls being provided with an opening at one end of said lower siphon so that when the end of said siphon provided with said opening is immersed in water and moved perpendicularly with respect to said side walls and parallel to said channel, water may be forced through said opening and lower siphon to prime said lower siphon, and said intermediate longitudinal wall terminating short of the other walls at the end remote from said side wall opening, while said lower wall comprises a short section which is bent angularly toward said upper wall just beyond the end of said intermediate wall, whereby the lower siphon will discharge liquid as a jet downwardly with respect to the upper siphon, the length and cross-sectional area of said upper siphon being so correlated that the jet discharged from said lower siphon will be sufficient to prime the upper siphon.

2. A siphon as claimed in claim 1 in which the end of said lower siphon in which said opening is located is otherwise closed.

3. A siphon as claimed in claim 2, in which the end of said lower siphon in which said opening is located extends downwardly beyond the corresponding end of said upper siphon.

References Cited in the file of this patent

UNITED STATES PATENTS

| 415,911 | Hawley | Nov. 26, 1889 |
|---|---|---|
| 665,826 | Carroll | Jan. 8, 1901 |
| 886,390 | Monighoff | May 5, 1908 |
| 1,083,995 | Davis et al. | Jan. 13, 1914 |
| 1,518,489 | Davies | Dec. 9, 1924 |
| 2,184,025 | Smith et al. | Dec. 19, 1939 |
| 2,762,202 | Ponsar | Sept. 11, 1956 |

FOREIGN PATENTS

| 9,654 | Switzerland | Dec. 12, 1894 |
|---|---|---|
| 1,135,493 | France | Dec. 17, 1956 |